(12) United States Patent
Wang

(10) Patent No.: US 9,904,132 B2
(45) Date of Patent: Feb. 27, 2018

(54) LIQUID CRYSTAL DISPLAY PANEL, ARRAY SUBSTRATE AND MANUFACTURING METHOD FOR THE SAME

(71) Applicant: Shenzhen China Star Optoelectronics Technology Co., Ltd., Shenzhen, Guangdong (CN)

(72) Inventor: Meng Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 192 days.

(21) Appl. No.: 14/903,356

(22) PCT Filed: Dec. 18, 2015

(86) PCT No.: PCT/CN2015/097901
§ 371 (c)(1),
(2) Date: Jan. 7, 2016

(87) PCT Pub. No.: WO2017/049780
PCT Pub. Date: Mar. 30, 2017

(65) Prior Publication Data
US 2017/0235198 A1    Aug. 17, 2017

(30) Foreign Application Priority Data

Sep. 22, 2015 (CN) .......................... 2015 1 0609170

(51) Int. Cl.
*G02F 1/1362* (2006.01)
*G02F 1/1368* (2006.01)
(Continued)

(52) U.S. Cl.
CPC ...... *G02F 1/136227* (2013.01); *G02F 1/1368* (2013.01); *G02F 1/13439* (2013.01);
(Continued)

(58) Field of Classification Search
CPC .......... G02F 1/13; G02F 1/136; G02F 1/1368; G02F 1/136286; G02F 1/1333;
(Continued)

(56) References Cited

U.S. PATENT DOCUMENTS 9,673,231 B2 * 6/2017 Shu ........................ H01L 27/124
2013/0329153 A1 * 12/2013 Yu ..................... G02F 1/136213
349/43
2015/0316802 A1 * 11/2015 Takanishi ............ H01L 27/1244
349/43

* cited by examiner

*Primary Examiner* — Thoi Duong
(74) *Attorney, Agent, or Firm* — Andrew C. Cheng

(57) ABSTRACT

The present invention provides an array substrate, and adds a floating electrode layer in a contact hole for realizing an electrical connection between a metal layer of a TFT and a pixel electrode layer such that the pixel electrode layer is electrically connected to the metal layer through a bridging of the floating layer so as to decrease a resistance value and decrease the film-breaking probability of the pixel electrode layer in the contact hole. Besides, an edge of the floating electrode layer is located in the contact hole so as to reduce a size of a black matrix, increase a pixel aperture ratio. The present invention also provides a method for manufacturing the array substrate and a liquid crystal display panel having the array substrate.

10 Claims, 4 Drawing Sheets

(51) Int. Cl.
*G02F 1/1333* (2006.01)
*G02F 1/1343* (2006.01)
*G02F 1/1335* (2006.01)

(52) U.S. Cl.
CPC .. *G02F 1/133345* (2013.01); *G02F 1/133512* (2013.01); *G02F 1/133514* (2013.01); *G02F 1/134309* (2013.01); *G02F 2201/121* (2013.01); *G02F 2201/123* (2013.01)

(58) Field of Classification Search
CPC ......... G02F 1/133345; G02F 1/134309; G02F 1/134363; G02F 1/136227; G02F 1/1335; G02F 1/133514; G02F 1/133707; G02F 1/134336; G02F 1/1362; G02F 1/1343; G02F 1/155; G02F 2001/134372; G02F 2001/13629; H01L 29/41733; H01L 29/786; H01L 29/458; H01L 27/3276; H01L 27/3262; G09G 2300/0426; G09G 2300/0434; G09G 3/3677; G09G 3/36; G09G 3/3648
USPC .......... 257/72; 349/139, 141, 143, 138, 106, 349/187, 43; 438/151, 158, 30
See application file for complete search history.

LIQUID CRYSTAL DISPLAY PANEL, ARRAY SUBSTRATE AND MANUFACTURING METHOD FOR THE SAME

BACKGROUND OF THE INVENTION

1. Field of the Invention

The present invention relates to a liquid crystal display field, and more particularly to an array substrate, a manufacturing method for the same and a liquid crystal display panel having the array substrate.

2. Description of Related Art

In a pixel structure of an array substrate as shown in FIG. 1, a pixel electrode layer 11 requires to be electrically connected with a metal layer M of a TFT (Thin Film Transistor) through a contact hole (via) 13 formed in the passivation layer 12. However, a thickness of the pixel electrode layer 11 is 40-60 nanometers and a thickness of the passivation layer 12 is 1.5-3 micrometers and an opening of the contact hole 13 is smaller such that the film-breaking probability of the pixel electrode layer 11 formed in the contact hole 13 is larger or a thickness of the pixel electrode layer 11 formed in the contact hole 13 is smaller. Therefore, a resistance value of the pixel electrode layer 11 at the contact hole portion 13 is higher so as to affect the display quality. In order to improve this problem, the conventional art provides a pixel structure as shown in FIG. 2, a floating electrode layer 14 is added in the contact hole 13, and the pixel electrode layer 11 is electrically connected to the TFT metal layer M through the bridging of the floating electrode layer 14 in order to decrease the resistance value and the film-breaking probability of the pixel electrode layer 11 at the contact hole 13. However, in order to avoid a short circuit of the floating electrode layer 14 and a common electrode layer 15, an edge distance between the common electrode layer 15 and the floating electrode layer 14 should be increased. Therefore, a size of the black matrix (BM) layer 16 is increased so as to decrease aperture ratio of the pixel.

SUMMARY OF THE INVENTION

Accordingly, the embodiment of the present invention provides a liquid display panel, an array substrate and manufacturing method for the same, which can not only decrease the resistance value and the film-breaking probability of the pixel electrode layer in the contact hole, but also ensure the aperture ratio of the pixel.

The array substrate provided by the embodiment of the present invention includes: a substrate; a metal layer formed on the substrate; a first passivation layer located on the metal layer, and the first passivation layer is provided with a first contact hole revealing a surface of the metal layer; a floating electrode layer covering a bottom surface of the first contact hole and a portion of side walls of the first contact hole connected with the bottom surface; a common electrode layer disposed on the first passivation layer and located at a periphery of the first contact hole; a second passivation layer located on the common electrode and the first passivation layer uncovered by the common electrode, and the second passivation layer is provided with a second contact hole which reveals a surface of the floating electrode layer; and a pixel electrode layer located on the second passivation layer and inside the first contact hole and the second contact hole such that the pixel electrode layer is electrically connected to the metal layer through the first contact hole and the second contact hole.

Wherein, the metal layer is one of a source electrode and a drain electrode of a thin film transistor of the array substrate.

Wherein, an upper edge of the floating electrode layer and the first contact hole are separated with a predetermined distance.

Wherein, the floating electrode layer and the common electrode layer are formed through a same mask process.

The liquid crystal display panel provided by the embodiment of the present invention includes: an array substrate and a color filter substrate disposed oppositely to and disposed separately with the array substrate, and the array substrate comprising: a substrate; a metal layer formed on the substrate; a first passivation layer located on the metal layer, and the first passivation layer is provided with a first contact hole revealing a surface of the metal layer; a floating electrode layer covering a bottom surface of the first contact hole and a portion of side walls of the first contact hole connected with the bottom surface; a common electrode layer disposed on the first passivation layer and located at a periphery of the first contact hole; a second passivation layer located on the common electrode and the first passivation layer uncovered by the common electrode, and the second passivation layer is provided with a second contact hole which reveals a surface of the floating electrode layer; and a pixel electrode layer located on the second passivation layer and inside the first contact hole and the second contact hole such that the pixel electrode layer is electrically connected to the metal layer through the first contact hole and the second contact hole.

Wherein, the metal layer is one of a source electrode and a drain electrode of a thin film transistor of the array substrate.

Wherein, an upper edge of the floating electrode layer and the first contact hole are separated with a predetermined distance.

Wherein, the floating electrode layer and the common electrode layer are formed through a same mask process.

Wherein, the color filter substrate includes a black matrix layer, and along a direction perpendicular to the array substrate, an edge of the black matrix layer is overlapped with an edge of the metal layer closed to the common electrode layer.

A manufacturing method for an array substrate provided by the embodiment of the present invention includes: forming a metal layer on a substrate; forming a first passivation layer on the metal layer, and forming a first contact hole which reveals a surface of the metal layer at the first passivation layer; forming a floating electrode layer in the first contact hole, and forming a common electrode layer on the first passivation layer, wherein, the floating electrode layer covers a bottom surface of the first contact hole and a portion of side walls of the first contact hole connected with the bottom surface, and the common electrode layer is located at a periphery of the first contact hole; forming a second passivation layer in the first contact hole, on the common electrode layer and on the first passivation layer which is uncovered by the common electrode, and forming a second contact hole on the second passivation layer which reveals a surface of the floating electrode; and forming a pixel electrode layer on the second passivation layer, in the first contact hole and the second contact hole such that the pixel electrode is electrically connected to the metal layer through the first contact hole and the second contact hole.

Wherein, the metal layer is one of a source electrode and a drain electrode of a thin film transistor of the array substrate.

Wherein, an upper edge of the floating electrode layer and the first contact hole are separated with a predetermined distance.

Wherein, the floating electrode layer and the common electrode layer are formed through a same mask process.

The liquid crystal display panel, the array substrate and the manufacturing method for the same add a floating electrode layer in a contact hole for realizing an electrical connection between a metal layer of a TFT and a pixel electrode layer such that the pixel electrode layer is electrically connected to the metal layer through a bridging of the floating layer so as to decrease a resistance value and decrease the film-breaking probability of the pixel electrode layer in the contact hole. Besides, an edge of the floating electrode layer is located in the contact hole so as to reduce a size of a black matrix, increase a pixel aperture ratio.

DETAILED DESCRIPTION OF THE PREFERRED EMBODIMENT

The following content combines figures and embodiments for detail description of the present invention.

Figure 3:
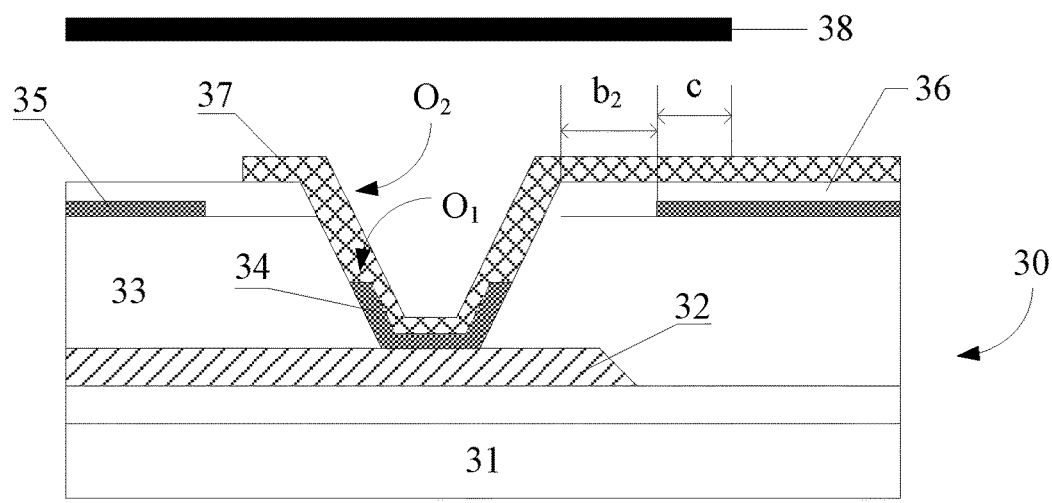
FIG. 3 is a structure cross-sectional view of an array substrate according to an embodiment of the present invention.

FIG. 3 is a structure cross-sectional view of an array substrate according to an embodiment of the present invention. As shown in FIG. 3, the array substrate 30 includes a substrate 31, a metal layer 32, a first passivation layer 33, a floating electrode layer 34, a common electrode layer 35, a second passivation layer 36 and a pixel electrode layer 37.

Wherein, the metal layer 32 is formed on the substrate 31, the first passivation layer 33 is formed on the metal layer 32, and the first passivation layer 33 is provided with a first contact hole $O_1$ revealing a surface of the metal layer 32. A floating electrode layer 34 covers a bottom surface of the first contact hole $O_1$ and a portion of side walls connected with the bottom surface. The common electrode layer 35 is disposed on the first passivation layer 33 and located at a periphery of the first contact hole $O_1$. That is, at a predetermined range (as shown as $b_2$ in the figure) of the periphery of the first contact hole $O_1$ on the passivation layer 33, the common electrode layer 35 is not provided. The second passivation layer 36 is located on the common electrode 35 and the first passivation layer 33 uncovered by the common electrode 35, and the second passivation layer 36 is provided with a second contact hole $O_2$ which reveals a surface of the floating electrode layer 34. The second contact hole $O_2$ and the first contact hole $O_1$ are communicated to form a contact hole as the conventional art. The pixel electrode layer 37 is located on the second passivation layer 36 and inside the first contact hole $O_1$ and the second contact hole $O_2$ such that the pixel electrode layer 37 is electrically connected to the metal layer 32 through the first contact hole $O_1$ and the second contact hole $O_2$.

Figure 1:
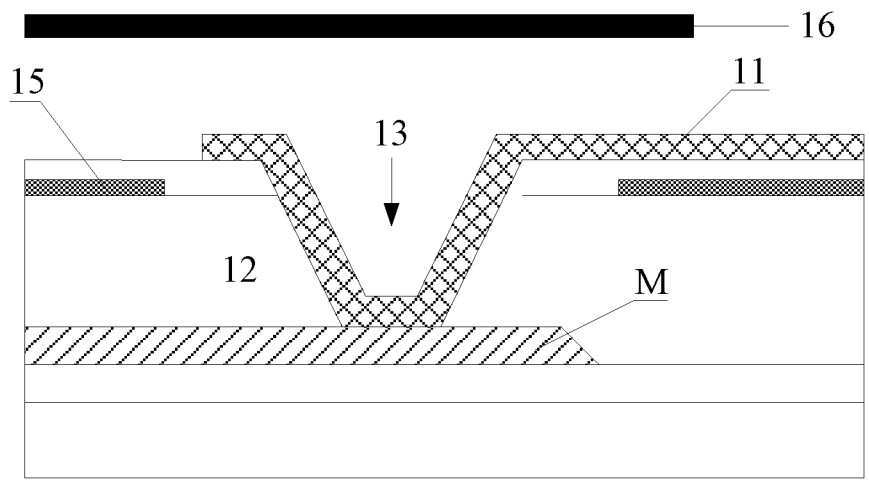
FIG. 1 is a structure cross-sectional view of an array substrate according to an embodiment of the conventional art.

The metal layer 32 can be one of a source electrode and a drain electrode of the thin film transistor of the array substrate 30. Comparing with the conventional art shown in FIG. 1, the embodiment of the present invention adds the floating electrode layer 34 in the contact hole that realizes the electric connection between the TFT metal layer 32 and the pixel electrode layer 37 such that the pixel electrode layer 37 is electrically connected to the metal layer 32 through the bridging of the floating layer 34 so as to decrease the film-breaking probability of the pixel electrode layer 37 in the contact hole, prevent the resistance value of the pixel electrode layer 37 from decreasing because of the smaller thickness of the pixel electrode layer 37 in the contact hole.

Figure 2:
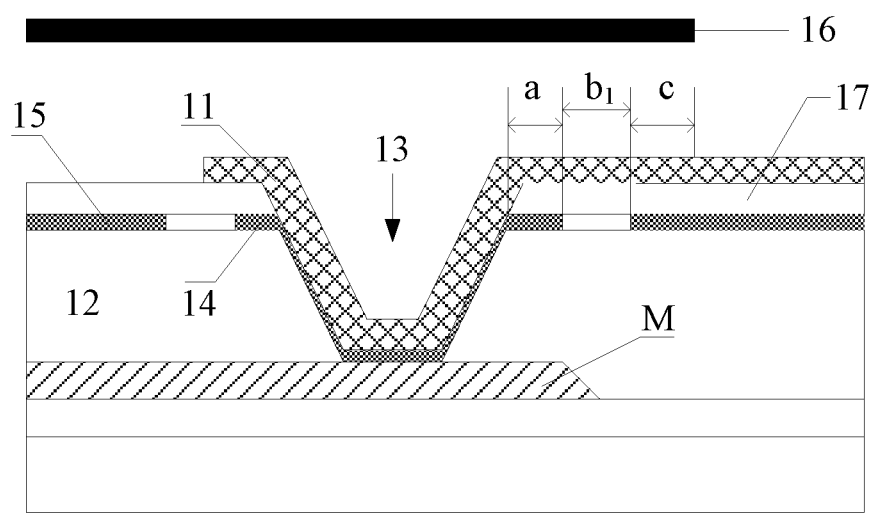
FIG. 2 is a structure cross-sectional view of an array substrate according to another embodiment of the conventional art.

The floating electrode layer 34 of the array substrate 30 of the embodiment of the present invention is completely located in the contact hole. That is, an upper edge of the floating electrode layer 34 and the first contact hole $O_1$ are separated with a predetermined distance. At this time, a size of a corresponding black matrix layer 38 at a right side of the second contact hole $O_2$ is $b_2+c$, wherein, $b_2$ is a distance between the common electrode layer 35 and an edge of the contact hole (the second contact hole $O_2$) and $c$ is an additional distance for preventing a light leakage. A size of the black matrix layer 16 located at a right side of the contact hole in FIG. 2 is $a+b_1+c$, wherein, $a$ is the size of the floating electrode layer 34 on the second passivation layer 17, $b_1$ is a distance between the common electrode layer 15 and an edge of the floating electrode layer 14. As shown, when $b_1=b_2$, comparing to the conventional art in FIG. 2, the embodiment of the present invention reduce the distance $a$ so that the present invention can reduce the size of the black matrix and increase the pixel aperture ratio.

Figure 4:
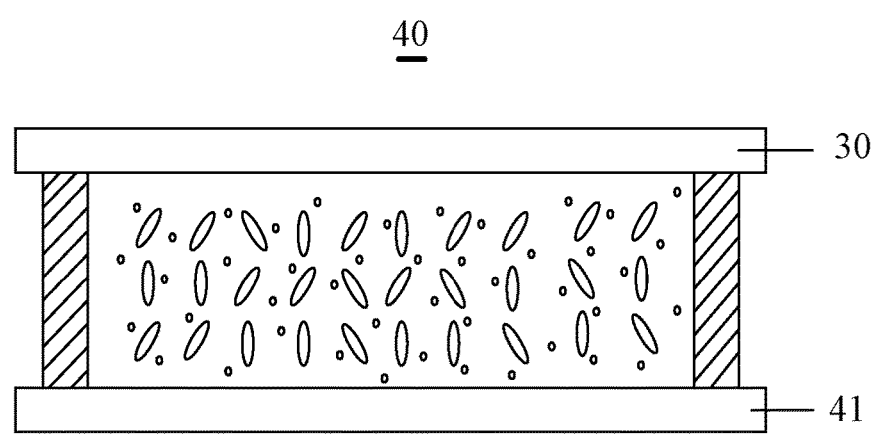
FIG. 4 is a structure cross-sectional view of a liquid crystal display panel according to an embodiment of the present invention.

The present invention also provides a liquid crystal display panel 40 as shown in FIG. 4. The liquid crystal display panel 40 includes the array substrate 40 described above and a color filter substrate 41 disposed oppositely to the array substrate and disposed with an interval. Wherein, the black matrix layer 38 can be disposed on the array substrate 40 or on the color filter substrate 41, and the only requirement is that an edge of the black matrix layer 38 is overlapped with an edge of the metal layer 32 closed to the common electrode layer 35, the overlapping can be understood as the structure shown in FIG. 3.

The floating electrode layer 34 and the common electrode layer 35 can be manufactured by a same process (mask) in order to reduce the manufacturing processes of the array substrate 30. Combining with FIG. 5 and FIG. 6 to illustrate the manufacturing method of the array substrate 30.

Figure 5:
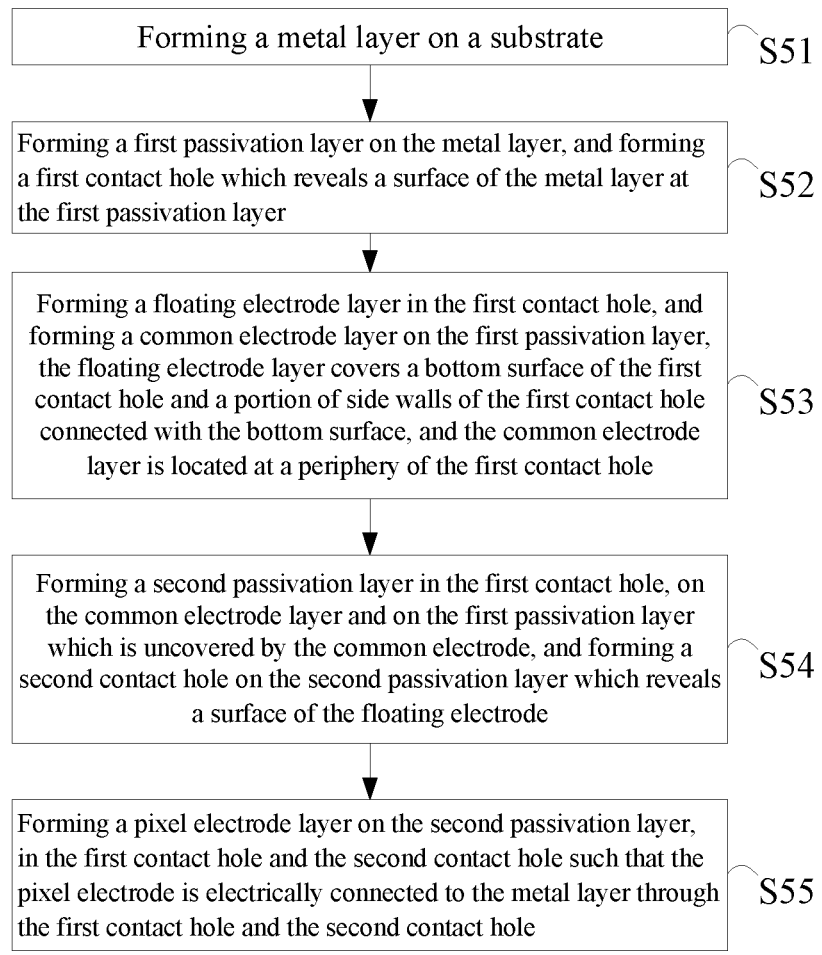
FIG. 5 is a schematic flowchart of a manufacturing method for an array substrate of the present invention.

FIG. 5 is a schematic flowchart of a manufacturing method for an array substrate of the present invention. As shown in FIG. 5, the manufacturing process of the present embodiment includes following steps:

S51: forming a metal layer on a substrate.

S52: forming a first passivation layer on the metal layer, and forming a first contact hole which reveals a surface of the metal layer at the first passivation layer.

Figure 6:
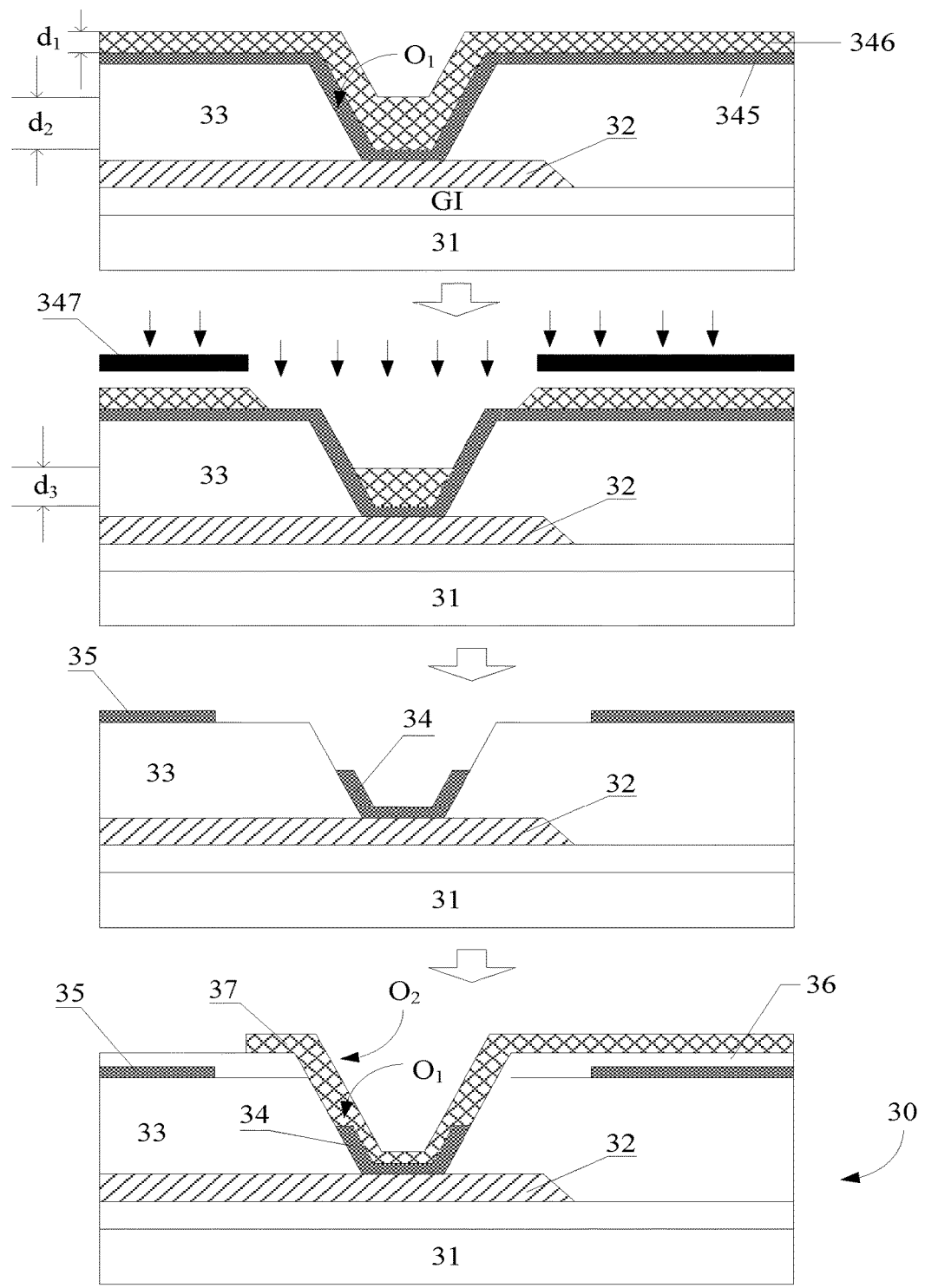
FIG. 6 is a schematic diagram of an array substrate manufactured by the method shown in FIG. 5.

As shown in FIG. 6, the substrate 31 is used for forming the array substrate 30 of the liquid crystal display panel 40. The substrate 31 can be a glass substrate, a plastic substrate or a flexible substrate.

The present embodiment can form the metal layer 32 on the substrate 31 through a CVD (Chemical vapor deposition), a vacuum deposition, a PECVD (Plasma Enhanced Chemical vapor deposition), a sputtering or a LPCVD (Low-pressure chemical vapor deposition). That is, forming a source electrode or a drain electrode of the thin film transistor of the array substrate 30 having a predetermined pattern. Correspondingly, a gate electrode of the thin film transistor is also required, and among the gate electrode, the source electrode and the drain electrode a gate insulation layer (GI) is provided.

The present embodiment can etch the entire first passivation layer 33 formed on the metal layer 32 through phosphoric acid, nitric acid, acetic acid and deionized water etchant in order to obtain the first passivation layer 33 having the first contact hole $O_1$. Of course, a dry etching can also be utilized.

S53: forming a floating electrode layer in the first contact hole, and forming a common electrode layer on the first passivation layer, the floating electrode layer covers a bottom surface of the first contact hole and a portion of side walls of the first contact hole connected with the bottom surface, and the common electrode layer is located at a periphery of the first contact hole.

With still reference to FIG. 6, an upper edge of the floating electrode layer 34 and the first contact hole $O_1$ is separated with a predetermined distance. The floating electrode layer 34 and the common electrode layer 35 can be formed through a same mask process. Specifically, forming an electrode layer 345 covering an entire surface of the first passivation layer 33 on the first passivation layer 33, and the electrode layer 345 covers the first contact hole $O_1$. Forming a photoresist layer 346 on the electrode layer 345, and exposing the photoresist layer 346 using a mask 347 in order to remove the photoresist layer 346 located in the first contact hole $O_1$. A remaining portion of the photoresist layer 346 covers a bottom surface of the first contact hole $O_1$ and a portion of the side walls of the first contact hole $O_1$ connected the bottom surface. Etching the electrode layer 345 not covered by the photoresist layer 346. Removing the remaining portion of the photoresist layer 346. Obtaining the floating electrode layer 34 and the common electrode layer 35 through etching.

Wherein, a thickness $d_1$ of the photoresist layer 346 located on the first passivation layer 33 is less than a thickness $d_2$ of the photoresist layer 346 located at the bottom surface of the first contact hole $O_1$, that is, $d_1<d_2$. The embodiment of the present invention can expose the photoresist layer 346 through a full-tone mask. A thickness $d_3$ of the photoresist layer 346 at the bottom surface of the first contact hole $O_1$ after the photoresist layer 346 is exposed is less than a thickness $d_2$ of the photoresist layer 346 at the bottom surface of the first contact hole $O_1$ before the photoresist layer 346 is exposed, that is $d_3<d_2$. Of course, a half-tone mask can also be used to expose the photoresist layer 346.

S54: forming a second passivation layer in the first contact hole, on the common electrode layer and on the first passivation layer which is uncovered by the common electrode, and forming a second contact hole on the second passivation layer which reveals a surface of the floating electrode.

S55: forming a pixel electrode layer on the second passivation layer, in the first contact hole and the second contact hole such that the pixel electrode is electrically connected to the metal layer through the first contact hole and the second contact hole.

The present embodiment can obtains the second contact hole $O_2$, the common electrode layer 35 having a predetermined pattern and a pixel electrode 37 through exposing, developing and etching. Besides, the pixel electrode 37 can be electrically connected to the metal layer 32 of the thin film transistor through the first contact hole $O_1$ and the second contact hole $O_2$. The gate electrode of the thin film transistor is electrically connected to a gate line formed on the array substrate 30. The source electrode of the thin film transistor is electrically connected to a data line formed on the array substrate 40. The gate line and the data line are intersected to form a pixel display region of the array substrate.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An array substrate comprising:
    a substrate;
    a metal layer formed on the substrate;
    a first passivation layer located on the metal layer, and the first passivation layer is provided with a first contact hole revealing a surface of the metal layer;
    a floating electrode layer completely located in the first contact hole, and covering and directly contacted with a bottom surface of the first contact hole and one portion of side walls of the first contact hole connected with the bottom surface;
    a common electrode layer disposed on the first passivation layer and located at a periphery of the first contact hole;
    a second passivation layer located on the common electrode and the first passivation layer uncovered by the common electrode, and the second passivation layer is provided with a second contact hole which reveals a surface of the floating electrode layer; and
    a pixel electrode layer located on the second passivation layer and inside the first contact hole and the second contact hole such that the pixel electrode layer is electrically connected to the metal layer through the first contact hole and the second contact hole;
    wherein the pixel electrode layer is directly contacted with the other portion of the side walls of the first contact hole connected with the bottom surface.

2. The array substrate according to claim 1, wherein, the metal layer is one of a source electrode and a drain electrode of a thin film transistor of the array substrate.

3. The array substrate according to claim 1, wherein, the floating electrode layer and the common electrode layer are formed through a same mask process.

4. A liquid crystal display panel, comprising an array substrate and a color filter substrate disposed oppositely to and disposed separately with the array substrate, and the array substrate comprising:
    a substrate;
    a metal layer formed on the substrate;
    a first passivation layer located on the metal layer, and the first passivation layer is provided with a first contact hole revealing a surface of the metal layer;
    a floating electrode layer completely located in the first contact hole, and covering and directly contacted with a bottom surface of the first contact hole and one portion of side walls of the first contact hole connected with the bottom surface;
    a common electrode layer disposed on the first passivation layer and located at a periphery of the first contact hole;

a second passivation layer located on the common electrode and the first passivation layer uncovered by the common electrode, and the second passivation layer is provided with a second contact hole which reveals a surface of the floating electrode layer; and a pixel electrode layer located on the second passivation layer and inside the first contact hole and the second contact hole such that the pixel electrode layer is electrically connected to the metal layer through the first contact hole and the second contact hole;

wherein the pixel electrode layer is directly contacted with the other portion of the side walls of the first contact hole connected with the bottom surface.

5. The array substrate according to claim 4, wherein, the metal layer is one of a source electrode and a drain electrode of a thin film transistor of the array substrate.

6. The array substrate according to claim 4, wherein, the floating electrode layer and the common electrode layer are formed through a same mask process.

7. The array substrate according to claim 4, wherein, the color filter substrate includes a black matrix layer, and along a direction perpendicular to the array substrate, an edge of the black matrix layer is overlapped with an edge of the metal layer closed to the common electrode layer.

8. A manufacturing method for an array substrate, comprising:

forming a metal layer on a substrate;

forming a first passivation layer on the metal layer, and forming a first contact hole which reveals a surface of the metal layer at the first passivation layer;

forming a floating electrode layer in the first contact hole, and forming a common electrode layer on the first passivation layer, wherein, the floating electrode layer is completely located in the first contact hole, and covers and directly contacts with a bottom surface of the first contact hole and one portion of side walls of the first contact hole connected with the bottom surface, and the common electrode layer is located at a periphery of the first contact hole;

forming a second passivation layer in the first contact hole, on the common electrode layer and on the first passivation layer which is uncovered by the common electrode, and forming a second contact hole on the second passivation layer which reveals a surface of the floating electrode; and forming a pixel electrode layer on the second passivation layer, in the first contact hole and the second contact hole such that the pixel electrode is electrically connected to the metal layer through the first contact hole and the second contact hole;

wherein the pixel electrode layer is directly contacted with the other portion of the side walls of the first contact hole connected with the bottom surface.

9. The method according to claim 8, wherein, the metal layer is one of a source electrode and a drain electrode of a thin film transistor of the array substrate.

10. The method according to claim 8, wherein, the floating electrode layer and the common electrode layer are formed through a same mask process.

* * * * *